United States Patent Office 3,115,008
Patented Dec. 24, 1963

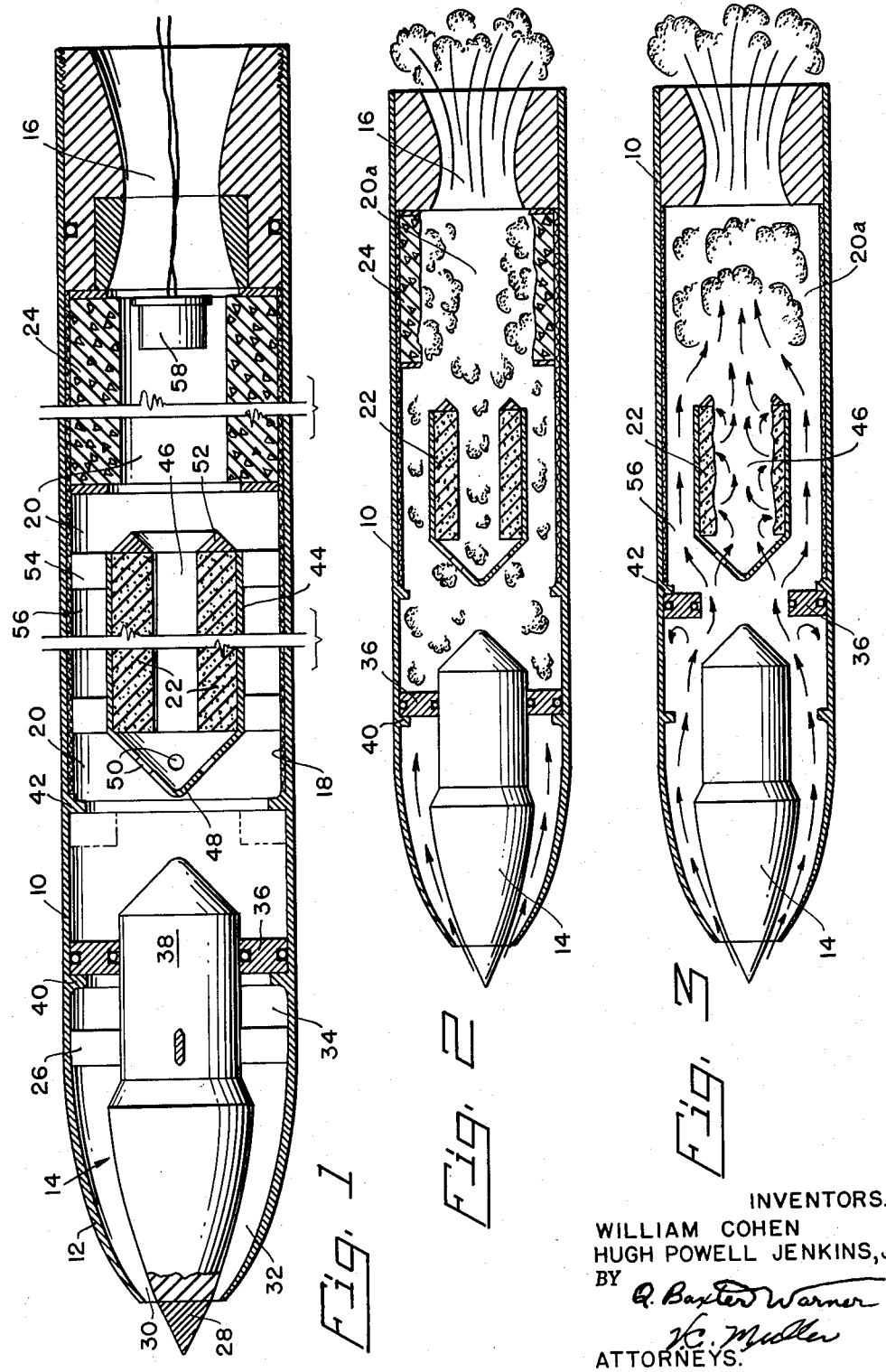
INVENTORS.
WILLIAM COHEN
HUGH POWELL JENKINS, JR.

3,115,008
INTEGRAL ROCKET RAMJET MISSILE
PROPULSION SYSTEM
William Cohen, Falls Church, Va., and Hugh P. Jenkins, Jr., China Lake, Calif., assignors to the United States of America as represented by the Secretary of the Navy
Filed Feb. 3, 1959, Ser. No. 790,975
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to missile propulsion systems and more particularly to improvements in booster rocket assisted ramjet power plants.

Such power plants are used in air to air missiles of the type fired at supersonic enemy bombers from subsonic fighter planes. In order to meet propulsion requirements arising from anticipated tactical conditions and recent improvements in guidance systems, such missiles must rapidly accelerate from a subsonic launch speed to a supersonic cruise speed and have a range in excess of 50 miles. The ramjet power plant can meet the cruise speed and range requirements, but it operates within a relatively narrow range of speeds and therefore cannot meet the acceleration requirement. The booster rocket is well suited to assist the ramjet power plant for this purpose since it operates at any speed and develops a high initial thrust. It has been the practice to employ a separate booster rocket, having its own motor tube and associated equipment, which is releasably attached to the missile with apparatus to jettison the same after burnout. Such arrangement results in a weight penalty due to the rocket motor tube and associated equipment and a drag penalty due to the volume of the separate booster rocket, such penalties being chargeable against both the missile itself and the fighter plane which carries the missile as part of its regular armament. Also, after it is jettisoned, the booster rocket may present a collision problem to the launching or other aircraft.

It is an object of the present invention to provide a simple unitary missile propulsion system of the type referred to.

It is a further object to provide such a system having greater range capacity than propulsion systems of comparable weight and size, heretofore available.

Other objects and many of the attendant advantages of this invention will be readily appreciated as the same becomes better understood by reference to the following detailed description when considered in connection with the accompanying drawings wherein:

FIG. 1 is a longitudinal central section of a missile utilizing the present invention; and FIGS. 2 and 3 are sections like FIG. 1, certain details being omitted, intended only to illustrate sequential conditions after missile launch.

Referring to the drawing, the subject of the invention comprises, in general, an elongated motor tube 10, having a constricted nose to provide a diffuser cowl 12, which cooperates with centerbody 14 to provide a ram air inlet and diffuser. The portion of the motor tube 10 intermediate the centerbody and exit nozzle 16 is lined with a fiberglass heat shield 18 to provide a combustion chamber 20 for ramjet fuel charge 22 and rocket propellant charge 24. Rocket charge 24 is adapted to propel the missile during the booster phase of propulsion, the period during which the missile is accelerated to design velocity while ramjet charge 22 is adapted to propel the missile during the sustainer phase of propulsion, the period during which the missile cruises at the design velocity. Conventional warhead and guidance system components, not shown, may be housed within the centerbody 14.

Referring now in detail to the diffuser assembly and associated parts, centerbody 14 is centrally supported within motor tube 10 by struts 26, in spaced relationship with respect to cowl 12 wherein the centerbody and cowl surfaces cooperate to form a shock spike 28, annular ram air intake 30, diffusing passage 32, and diffuser outlet passage 34, collectively comprising a conventional supersonic conical entrance diffuser, which received ram air and transforms it into a stream of diffused air, having pressure and velocity characteristics suitable for ramjet operation. An annular plug member 36 is disposed within outlet passage 34, its outer peripheral surface slideably engaging the inside wall of the motor tube and its inner surface slideably engaging a cylindrical rearward projecting portion 38 forming a part of the centerbody 14, thus providing a valve which may prevent or establish communication, depending upon its position, between the diffuser and combustion chamber. O-rings, as shown, may be employed to prevent leakage of diffused air or combustion gases across the valve. In the full line or closed position of the plug as shown in FIGS. 1 and 2, ram air pressure is exerted on its front face and combustion chamber pressure is exerted on its rear face. If the pressure within the combustion chamber exceeds the ram air pressure, the plug is retained in the closed position against an abutment 40. If the ram air pressure exceeds the combustion chamber pressure, the plug is moved to the dotted or open position shown in FIG. 1 or the position as shown in FIG. 3, wherein it abuts an abutment 42 and permits communication between the diffuser and combustion chamber. During the booster propulsion phase illustrated in FIG. 3 the pressure generated in the combustion chamber 20 by rocket charge 24 exceeds the ram air pressure and plug 36 is thereby retained in the closed position. At the termination of the booster propulsion phase, ram air pressure which has built up as the result of missile velocity causes plug 36 to move to the open position as illustrated in FIG. 3. Plug 36 therefore comprises valve means closing outlet passage 34 and adapted to open the passage in response to the decline in combustion chamber pressure accompanying rocket charge burnout to thereby introduce diffused air into the combustion chamber at the start of the sustainer propulsion phase.

Ramjet charge 22, comprising an elongated hollow cylindrical briquette of suitable fuel, such as powdered magnesium, is cemented within an aluminum fuel charge liner 44, thereby restricting the burning surface to the central perforation 46 extending between its ends. A conical cap 48, having apertures 50 therein, is fixed over the front end of the fuel charge 22, to generally meter the proportion of air passing through perforation 46. Shielding 52 made of inhibiting material, is secured to the rear end portion of ramjet fuel charge 22, to protect it from the heat generated by the rocket charge 24 during the booster propulsion phase and to prevent local erosion due to gas flow during the sustainer propulsion phase. Fuel charge liner 44 is centrally supported within motor tube 10 by struts 54, providing an annular bypass passage 56 between the fuel charge liner 44 and the heat shield 18. This arrangement of the fuel charge and accessories divides the stream of diffused air into two portions, one portion comprising 5% to 10% of the total air mass flow, passing through perforation 46 and the remainder, hereinafter referred to as bypass air, passing through bypass passage 56. The limited flow of air across the ramjet fuel burning surface within perforation 46, results in a relatively low rate of burning of the fuel, producing a hot fuel rich gaseous mixture which is discharged downstream of the perforation, there to mix and react with the bypass air producing the sustainer propulsion gases. It has been found that the low rate of burning results in longer fuel burning time than possible with the entire stream passing along the burning surfaces. In addition it has been found that the two step reaction producing a fuel rich mixture followed by subsequent reaction between this mixture and bypass air results in greater thrust than possible with a single step reaction. Also, the air passing through bypass passage 56 cools the combustion chamber wall, thus preventing its erosion.

Rocket charge 24, a conventional double base internal burning rocket grain, and a conventional igniter 58 are disposed within the motor tube 10 between ramjet charge 22 and exit nozzle 16 by means of spacers, bonding agents and other means, known in the art. Exit nozzle 16 has a throat area to exit area ratio, chosen as a compromise between the optimum ratio for rocket operation and the optimum ratio for ramjet operation. After burnout of rocket charge 24, the volume that had been occupied by the rocket charge now becomes combustion chamber volume in which the fuel rich mixture and bypass air may mix and react. It thus becomes apparent, in contradistinction to prior art devices employing a separate rocket booster motor for a ramjet, that the space and weight of the rocket motor tube together with its drag is eliminated thus producing a device which, for the same volume and weight may have increased range.

It will now be assumed that it is desired to launch the missile. Igniter 58 is fired, igniting rocket charge 24, thereby producing combustion gases illustrated in FIG. 2, which retain plug 34 in the closed position. The rocket combustion gases exhaust into the surrounding atmosphere through exit nozzle 16 thereby generating booster thrust. Upon rocket burnout, the ram air moves plug 36 to the open position thereby introducing diffused air into the combustion chamber 20. By this time the missile has accelerated to a speed permitting ramjet operation and ramjet fuel charge 22 is sufficiently heated, as a result of exposure to the rocket propulsion gases, to immediately react with the incoming air producing the combustion chamber conditions illustrated in FIG. 3. As heretofore explained, low rate of burning takes place within perforation 46, discharging a fuel rich mixture downstream thereof where it reacts with the bypass air flowing through bypass passage 56 producing propulsion gases which exhaust through exit nozzle 16 to thereby generate the sustainer propulsion thrust. The fuel rich mixture emerging from perforation 46 comprises particles having flame zones thereabout so that it takes a finite time for the oxygen of the ram air to diffuse through the zones of flame to cause complete burning. A zone of reaction 20a, FIG. 3 is provided downstream of the sustainer fuel 22, such zone being at least of sufficient length to permit such diffusion over the time it takes for the gases to travel to exhaust nozzle 16, permitting substantially complete burning of the fuel rich product of reaction before the gases are exhausted through the nozzle.

Obviously many modifications and variations of the present invention are possible in the light of the above teachings. It is therefore to be understood that within the scope of the appended claim the invention may be practiced otherwise than as specifically described.

What is claimed is:

In a reaction motor of the type having a combustion chamber having therein a booster propellant comprising fuel and oxidant adapted to burn at stoichiometric ratio to produce propulsion gases and a sustainer fuel adapted to react with ram air to produce propulsion gases, a ram air inlet for introducing ambient ram air to said combustion chamber and a valve initially closing same adapted to open upon burnout of said booster propellant, and a nozzle for exhausting propulsion gases from said combustion chamber, the improvements, in combination, comprising; means for metering a portion of said ram air to said sustainer fuel to produce fuel rich products of combustion, means for by-passing the remainder of the air to react with said products of combustion, and a zone for reaction between said products of combustion and the remainder of air formed in said combustion chamber adapted to permit substantially complete burning of said products of reaction before they are exhausted through said nozzle, said booster propellant is located downstream relative to the sustainer fuel, said booster propellant being so arranged to provide said reaction zone after burnout of said booster propellant.

References Cited in the file of this patent

UNITED STATES PATENTS

| 2,632,295 | Price | Mar. 24, 1953 |
| 2,684,570 | Nordfors | July 27, 1954 |
| 2,799,987 | Chandler | July 23, 1957 |